United States Patent [19]

Peruglia

[11] 3,808,829
[45] May 7, 1974

[54] DELIVERY LIMITING VALVE UNIT FOR REFRIGERATION CIRCUITS

[75] Inventor: Marco Peruglia, Turin, Italy

[73] Assignee: Fiat Societe per Azioni, Turin, Italy

[22] Filed: Apr. 4, 1973

[21] Appl. No.: 347,766

[30] Foreign Application Priority Data
Apr. 19, 1972  Italy.................................. 68222/72

[52] U.S. Cl..................................... 62/217, 251/30
[51] Int. Cl............................................ F25b 41/04
[58] Field of Search.......... 251/30, 43; 62/196, 217, 62/207, 209

[56] References Cited
UNITED STATES PATENTS

| | | | |
|---|---|---|---|
| 3,242,688 | 3/1966 | Miller | 62/217 |
| 3,338,518 | 8/1967 | Barbier | 62/217 |
| 3,698,204 | 10/1972 | Schlottebeck | 62/217 |
| 2,401,144 | 5/1946 | Dube | 251/43 |

Primary Examiner—Meyer Perlin
Attorney, Agent, or Firm—Sughrue, Rothwell, Mion, Zinn & Macpeak

[57]  ABSTRACT

A delivery limiting valve for the control of a refrigeration circuit of the type comprising a continuously driven compressor, a condenser, and an evaporator, the valve being located in the pipe between the evaporator and the compressor and including two passages communicating between the inlet and outlet ports of the valve. A first passageway, which makes permanent communication allows only a very restricted flow therethrough, and a second passageway, which is closeable by a valve shutter, allows full free flow therethrough. The valve includes a solenoid operated valve shutter which controls a bypass route from the inlet port to the outlet port, which includes the chamber within which the shutter for the second passageway is located. When the solenoid is energized the bypass route is open causing a lowering of pressure in the valve shutter chamber with respect to the pressure in the second passageway thereby keeping the valve shutter open. Switches and/or thermostats located at various parts of the refrigerator circuit control the energization of the solenoid and thus the opening and closing of the second passageway by the shutter.

1 Claim, 5 Drawing Figures

DELIVERY LIMITING VALVE UNIT FOR REFRIGERATION CIRCUITS

BACKGROUND OF THE INVENTION

The present invention relates to a delivery-limiting valve for refrigeration circuits, which is particularly suitable for use in the refrigeration circuits of air conditioners. In particular, valves to which the invention relates are suitable for use in air conditioning systems for the passenger compartment of a motor vehicle.

Known refrigeration systems generally include a compressor which pumps a cooling fluid, such as that known by the trade name "Freon 12", to a condenser from where it passes to an expander or evaporator positioned where the cooling effect is desired, finally the fluid returns to the pump and is recirculated around the circuit.

In order to control the degree of cooling produced by the system, instead of switching the compressor on and off, which has its attendant disadvantages, particularly if it is driven by the engine of the motor vehicle, it is known to provide a regulating device for controlling the flow of the cooling fluid around the circuit in dependence on the requirements of the circuit and also on external factors such as, for example, the temperature required for comfort of the passengers in the vehicle.

In order to meet such requirements, arrangements have been proposed which regulate the rate of flow of the circulating fluid as a function of the pressure of the circuit immediately downstream of the compressor; one such solution is described in Italian Patent Application No. 67251-A/72. Although the system described in that application works satisfactorily in most respects it does not solve the problem of frosting of the cooling elements of the evaporator when the temperature of these elements drops below a particular value; a further Patent Application by the same Applicants proposes an arrangement sensitive to a threshold pressure in the circuit, corresponding to the frosting temperature, which operates to reduce the flow of cooling fluid when the pressure drops below that critical threshold value.

Both of these arrangements are automatic devices sensitive to absolute pressures and thus are not capable of subsequent regulation once they have been installed in the vehicle; moreover, there is no possibility of regulation by the passengers to suit individual requirements.

OBJECTS OF THE INVENTION

It is one object of the present invention to provide a delivery-limiting valve for an air-conditioning system, which is sensitive to the abovementioned critical threshold pressure, but which nevertheless is adjustable to enable the users of the air conditioner to adjust the system to different conditions and requirements.

It is another object of the present invention to provide a delivery limiting valve unit which can be adjusted by remote control, the control element of which can be placed in any desired position in the vehicle.

SUMMARY OF THE INVENTION

According to the present invention a delivery-limiting valve unit for a refrigeration circuit of the type comprising in series a compressor, a condenser and an evaporator, and having means for regulating the delivery of the fluid to the compressor, the said valve having an inlet port connected to the outlet of the evaporator and an outlet port connected to the inlet of the compressor, the two ports being in permanent communication via a first passageway including a throttle construction and also being in communication via a further passage which is closable by a shutter movable between two positions in dependence on the pressure difference between the outlet of the compressor and the outlet of the evaporator, is characterised in that the said shutter is located in a chamber which is connected to the inlet port of the valve through a second passageway having a second throttle construction, the chamber also being connected via a second passageway to a second chamber, fluid flow through which is controlled by a shutter operated by an electrovalve, the second chamber communicating via a third passageway of diameter greater than the throttle of the first passageway, which is closed by the shutter of the electrovalve which is resiliently biased to the closed position when the winding is de-energized, and opened upon excitation of the winding of the electrovalve.

Various other features and advantages of the invention will become apparent from a consideration of the following description with reference to the accompanying drawings, which is provided purely by way of non-restrictive example.

DESCRIPTION OF THE PREFERRED EMBODIMENTS

Figure 1:
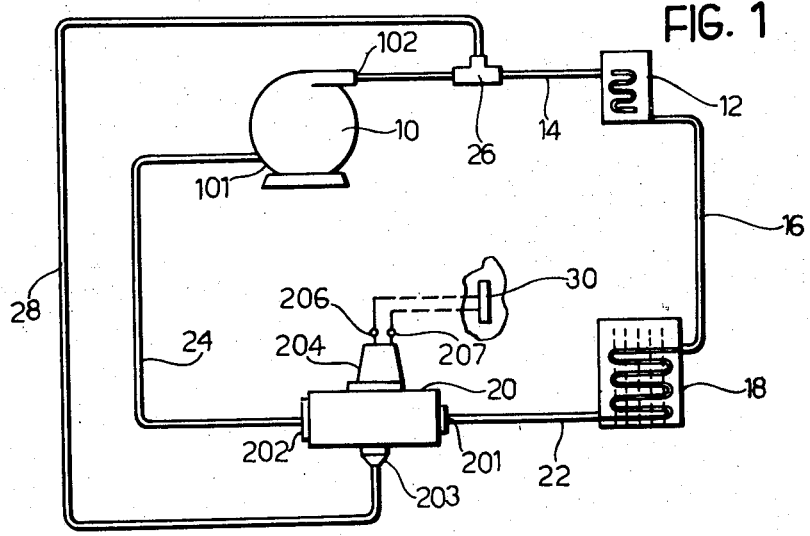
FIG. 1 is a schematic diagram of a cooling system for motor vehicles, incorporating a delivery limiting valve formed as an embodiment of the invention.
Figure 2:
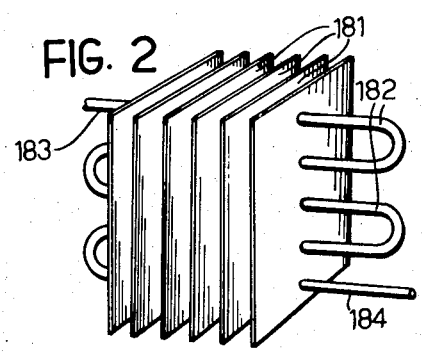
FIG. 2 is a perspective view of the evaporator of the cooling system shown in FIG. 1.

Referring now to the drawings, in FIG. 1 there is shown a refrigeration circuit including a compressor 10 of a known type, this pumps cooling fluid, such as the fluid known under the trade name of "Freon 12" to a condenser 12 through a conduit 14. The fluid then passes through a conduit 16 to an evaporator 18 which is placed in the environment which it is desired to cool; the evaporator 18, as shown in FIG. 2, is of the type comprising a plurality of plates 181 traversed by a coil 182: the input end 183 of the coil is connected to the conduit 16 and the output end 184 of the coil is connected to the conduit 22 which leads to an inlet port 201 of a delivery limiting valve 20. The valve 20 has an outlet port 202 which is connected through a conduit 24 to the induction port 101 of the compressor 10.

A three-way junction 26 is connected in the conduit 12 between a delivery port 102 of the compressor 10 and the condenser 12; this connects this part of the circuit, through a conduit 28, with a control port 203 in the valve 20. The valve 20 is provided with an electrically operated valve 204, hereinafter termed an "electrovalve," the function of which will be described in more detail hereinafter. The electrovalve 204 has a solenoid 205 the terminals 206, 207 of which are connected by leads to a regulator element 30, which may be placed at any convenient position in the vehicle remote from the valve 204. The element 30 may be an adjustable thermostat, a pressure sensitive switch or other suitable control element, as will be described in greater detail below.

Figure 4:
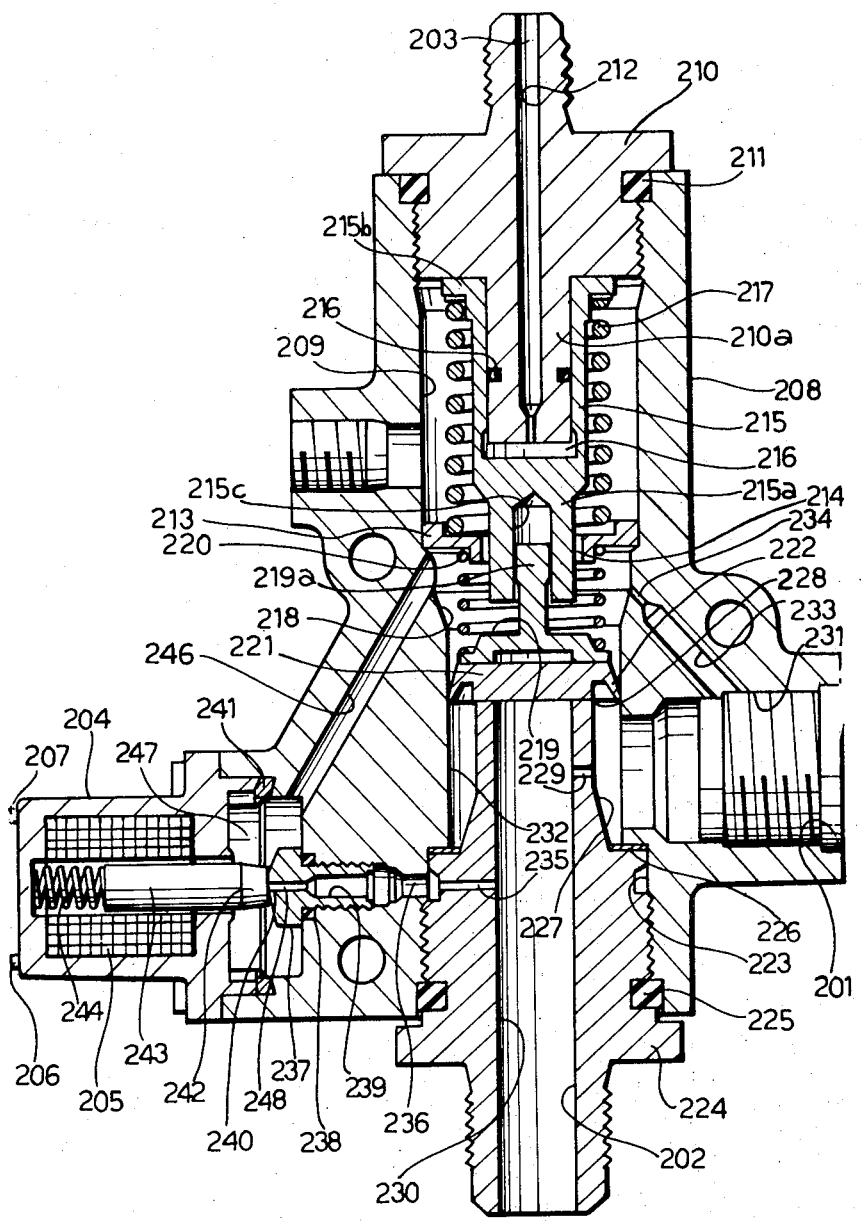
FIG. 4 is a section of a delivery limiting valve formed as an embodiment of this invention.

Referring now to FIG. 4, the valve 20 comprises a substantially cylindrical body 208 having an axial cylindrical bore having a number of parts of different diameters so as to define a series of chambers within the body of the valve.

The uppermost chamber 209 (in the orientation shown in FIG. 4) has a plug 210 closing the top thereof. An extension 210a of the plug 10 extends inside the chamber 209 and a sealing ring 211 ensures sealing of the end of the chamber 209 by the plug 210. The plug 210 also has an axial bore 212 which has a control orifice 203. At the base of the chamber 209 there is fixed a diaphragm 213 having a central aperture 214; a cup shaped piston 215 is free to move axially sealed tightly by a sealing ring 216 over the outer surfaces of the extension part 210a of the plug 210. The piston 215 has an extension 215a which extends through the central aperture 214 of the diaphragm 213 leaving an intermediate space 214; the axial position of the piston 215 is determined by the difference between the pressure at the control orifice 203, which is transmitted to the chamber 216, and a force exerted on the piston by a precompressed spring 217 which is compressed between the diaphragm 213 and an annular shoulder 215b of the piston 215.

The first chamber 209 communicates via the intermediate space 214 between the diaphragm and the extension 215a of the piston 215 with a second chamber 218 of less diameter in which can move a small plunger 219 provided with a stem 219a which is axially slidable within a bore 215c having a closed end in the piston 215. The plunger 219 is held away from the piston 215 (with its stem 219a engaged in the bore 215c) by means of a relatively weak spring 220 which is compressed between the diaphragm 213 and the plunger 219. Mounted on the plunger 219 is a shutter 221 provided with a rim 222 of elastomeric material which forms a seal against the walls of the chamber 218.

On the lower end of the body 208 of the valve there is provided a chamber 232 and a larger coaxial chamber 223. The larger chamber 223 is closed by a plug 224 which has a seal 226 closing communication between the two chambers 223 and 232, and a seal 225 closing communication between the chamber 223 and the atmosphere; the plug 224 has an annular projection 227 extending inside the chamber 232 which terminates in a valve seat 228 with which the shutter 221 cooperates in a manner which will be described in greater detail below. A radial orifice 229 is formed in the annular projection 227 and allows communication at all times between a central bore 230 which passes through the entire plug 224 communicating with the atmosphere, and the chamber 232.

Radially to the body 208 of the valve there is provided a passageway 231 which communicates with the chamber 232 and with the inlet port 201. A passage 223 allows communication between the passageway 231 and the chamber 218, the passage 233 having a restrictor throttle 234.

A further small radial passage 235 is formed in the plug 224, this passage communicates between the axial bore 230 of the plug 224 and the chamber 223 and also with a radial orifice 236. A plug 237 seals the orifice 236 with a sealing ring 238; the plug 237 has an axial bore 239 and is furnished at its end with a valve seat 240. Coaxial with the plug 237 and consequently with the valve seat 240 there is fixed an electro-valve 204 which is sealed to the body 208 of the valve by a sealing ring 204. The armature 243 of the electrovalve which is integral with a core 243, is thrust against the valve seat 240 by a spring 244 when the solenoid 205 is not excited.

Figure 5:
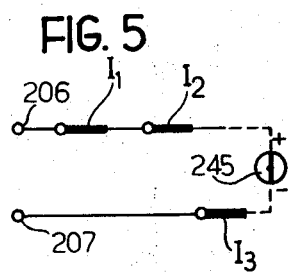
FIG. 5 is a diagram illustrating one arrangement for obtaining the desired remote control of the system.

The solenoid 205 is connectable to a direct current source 245 by means of switches $I_1$, $I_2$, $I_3$, placed in series one with the other: the function and operation of these switches is described in more detail with respect to FIG. 5.

A passage 246 connects the chamber 218 with the chamber 247 controlled by the electrovalve 204.

OPERATION

Figure 3:
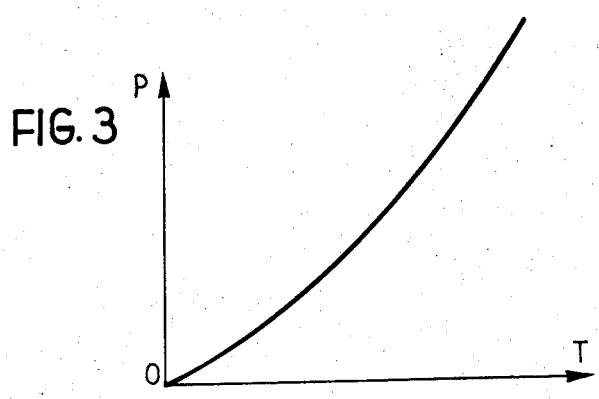
FIG. 3 is a diagram representing the variation of pressure as a function of the temperature of the evaporator of the system.

During operation of the refrigerator circuit the conditions at the evaporator 18 are such that the fluid in the coil exists in the presence of its saturated vapour; under these conditions there is a single correspondence between pressure and temperature, which is represented in the diagram of FIG. 3. Control of the pressure in the evaporator thus automatically ensures control of the temperature and vice-versa.

During normal operation of the refrigeration circuit the plunger 221 is raised from the valve seat 228 allowing free communication between the inlet port 201 and the outlet port 202. The piston 215 is urged by the spring 217 to the uppermost position with its flange 215b abutting the plug 210. If the difference between the pressure at the compressor outlet and at the evaporator outlet increases beyond a threshold value determined by the precompression of the spring 217, the piston 215 moves downwards, presing down the plunger 219 and forcing the shutter 221 against the valve seat 228 closing communication between the inlet port 201 and the outlet port 202. Pressure in the circuit thus starts to rise at the evaporator and fall at the compressor until it again reaches the safety value and the piston 215 rises again under the action of the spring 217. The orifice 229 is provided to prevent total closure of the circuit to avoid the danger that the compressor might create a vacuum sufficient to withdraw lubricating oil from its sump.

FIG. 5 shows that in normal operation the solenoid 205 of the electrovalve 204 is constantly excited and therefore the shutter 242 is spaced from the valve seat 240; under these conditions the fluid can flow through the conduit 233 across the chamber 218, along the passage 246, and through the orifice 248 and the passages 239 and 230 into the outlet port 202. Because the diameter of the orifice 248 is greater than the diameter of the throttle 234 the pressure in the chambers 218 is less than that in the inlet port 202 and thus the shutter 221 is raised from the valve seat 228 against the action of the spring 220 and there is free communication between the inlet port 201 and the outlet port 202. The compressor thus operates to provide full delivery.

If one of the switches $I_1$, $I_2$ or $I_3$ should open, the solenoid is de-energised and the shutter 242 closes the orifice 248. The pressure in the chamber 218 then becomes equalised with that of the inlet port and thus the spring 220 urges the shutter 219 against the valve seat 228. The switches $I_1$, $I_2$, $I_3$ may be connected to actuators positioned at particular points in the circuit which it is desired to protect, for example $I_1$ may be connected to a thermostat (not shown) placed between adjacent plates of the evaporator 18 and arranged to be sensitive to the frosting temperature to open $I_1$ when the frosting temperature is approached. Equalisation of the pressures in the chamber 218 and the chamber 232 allows the spring 220 to close the valve seat 228 with the same results as when this is closed by movement of the piston 215, that is almost complete stoppage of circulation around the refrigeration circuit and consequent eventual rise in temperature from heat drawn from the surroundings. By means of another switch $I_2$, connected to a thermostat inside the vehicle, it is possible to regulate the temperature of the cab as desired. Also, a switch $I_3$ may be connected to a thermostat sensitive to the temperature of the circulating fluid so as to be actuated when the temperature thereof drops beyond a predetermined acceptable limit.

When one of the switches is open and the conditions change causing it to close, the solenoid 205 is energised and the shutter 242 moves away from the orifice 248 opening communication again between the passage 233, the chamber 218 and the passage 246 to the outlet port 202 and a considerable depression is created in the chamber 218 which draws the shutter 221 to the open position to allow full working of the system.

I claim:

1. A delivery limiting valve for a refrigeration circuit of the type comprising:

a compressor having an inlet and an outlet, a condenser, means connecting the condenser to the outlet of the compressor, an evaporator having an inlet and an outlet, means connecting the condenser to the inlet of the evaporator, said valve having an inlet port connected to said outlet of said evaporator, and an outlet port connected to said inlet of said compressor, first and second passageways connecting said inlet port and said outlet port of said valve, said first passageway being permanently open and including a throttle restrictor and said second passageway allowing full free flow between said inlet port and said outlet port, first valve shutter means controlling said second passageway and being movable between first and second positions to close or open said second passageway, a first chamber housing said first valve shutter means, said first valve shutter means being movable therealong between said first and second positions in dependence on the pressure difference between said second passageway and said first chamber, a third passageway, including a throttle restrictor, connecting said first chamber and said inlet port, a second chamber, a fourth passageway connecting said first chamber and said second chamber, a fifth passageway connecting said second chamber and said outlet port, said fifth passageway being of larger diameter than said throttle restrictor in said third passageway, second valve shutter means in said second chamber movable between first and second positions to open or close said fifth passageway, solenoid means controlling the position of said second valve shutter means to open said second valve shutter means when energized, resilient biasing means closing said second valve shutter means when said solenoid means is de-energised, whereby when said solenoid is energised said pressure in said first chamber is less than said pressure in said second passageway such that said first valve shutter means is open and when said solenoid is de-energised said pressure in said first chamber is equalised with said pressure in said second chamber and said first valve shutter means are closed, fluid flow through said valve then taking place at a low rate through said first passageway.

* * * * *